(12) United States Patent
Peters (10) Patent No.: US 9,031,077 B2
(45) Date of Patent: May 12, 2015

(54) SYSTEMS, METHODS, AND COMPUTER PROGRAM PRODUCTS PROVIDING A DATA UNIT SEQUENCING QUEUE

(71) Applicant: Genband US LLC, Frisco, TX (US)

(72) Inventor: Matthew Lorne Peters, Kanata (CA)

(73) Assignee: Genband US LLC, Frisco, TX (US)

( * ) Notice: Subject to any disclaimer, the term of this patent is extended or adjusted under 35 U.S.C. 154(b) by 189 days.

(21) Appl. No.: 13/804,693

(22) Filed: Mar. 14, 2013

(65) Prior Publication Data

US 2014/0281417 A1    Sep. 18, 2014

(51) Int. Cl.
*H04L 12/28*    (2006.01)
*G06F 9/30*    (2006.01)
*H04L 12/861*    (2013.01)
*H04L 12/801*    (2013.01)

(52) U.S. Cl.
CPC .............. *G06F 9/3004* (2013.01); *H04L 49/90* (2013.01); *H04L 47/34* (2013.01); *H04L 47/10* (2013.01)

(58) Field of Classification Search
None
See application file for complete search history.

(56) References Cited

U.S. PATENT DOCUMENTS 7,701,459 B1 *   4/2010   Mrazek et al. ................ 345/505
2004/0081156 A1 *   4/2004   Hassan-Ali et al. ....... 370/395.1

* cited by examiner

*Primary Examiner* — Kibrom T Hailu
(74) *Attorney, Agent, or Firm* — Haynes and Boon, LLP (57) ABSTRACT

A system for passing data, the system including multiple data producers passing processed data, wherein the processed data include discrete data units that are each consecutively numbered, each of the data producers calculating insertion indices for ones of the data units passing therethrough; a circular buffer receiving the data units from the producers, the data units placed in slots that correspond to the respective insertion indices; and a consumer of the data units that receives the data units from the circular buffer in an order that preserves sequential numbering of the data units, wherein the multiple data producers follow a protocol so that a first one of the data producers, upon failing to place a first data unit in the circular buffer, does not lock other data producers from placing other data units in the circular buffer.

20 Claims, 4 Drawing Sheets

SYSTEMS, METHODS, AND COMPUTER PROGRAM PRODUCTS PROVIDING A DATA UNIT SEQUENCING QUEUE

TECHNICAL FIELD

The present description relates, in general, to computer systems that pass data units and, more specifically, to techniques for passing data units in an order in which they were received.

BACKGROUND

Some systems queue data elements and sort the queue, such as in the case of queuing data packets for processing in a desired order with real-time or non-real-time communications. A basic queue sorting algorithm includes maintaining a sorted list of elements. New elements are inserted in-order by scanning from the head of the queue and placing the new element in the appropriate (sorted) position within the list. Elements are removed from the head of the list to process them in sequence. Such algorithm may be inefficient when elements commonly are inserted in the middle of the list (i.e. not at the head), which is the case when reordering the elements.

A more efficient algorithm includes implementing a sorted list as an ordered binary tree with the root of the tree being the next available element in the sequence. This form of binary tree is also referred to as a "min-heap". This solution improves on the search performance required to find the insertion point by reducing the search time to O(1) but still uses several nodes of the tree to be visited and possibly swapped. Insertion overhead can still be inefficient as the common case of insertion usually involves a rebalance of the tree. Thus, while such algorithm may be well-suited for efficiently sorting a general purpose data set, it is generally not suitable for real-time packet processing.

A more general approach than using an ordered queue is to simply block the processing of a current element at a critical section that uses ordered processing. Such mechanism stalls the current handling of the element to wait for an element that must be processed before the current one. This is a simple algorithm, but causes significant degradation of performance since the stalling of other processing engines in a system can erode performance throughput.

The approaches above do not offer a sorting or ordering algorithm to efficiently order data packets in real-time or near real-time as they are passed through a multicore parallel processing computing system.

BRIEF DESCRIPTION OF THE DRAWINGS

The present disclosure is best understood from the following detailed description when read with the accompanying figures.

SUMMARY

According to one embodiment, a parallel data unit processing system for passing data is disclosed, the system including: multiple data producers passing processed data, wherein the processed data include discrete data units that are each consecutively numbered, each of the data producers calculating insertion indices for ones of the data units passing therethrough; and a circular buffer receiving the data units from the producers, the data units placed in slots that correspond to the respective insertion indices; wherein the multiple data producers follow a protocol so that the multiple data producers operate independently of each other and without coordination or hand-shaking with each other.

According to another embodiment, a method is disclosed for passing a plurality of ordered data units in a system that includes multiple data producers, a data consumer, and a memory buffer between the data producers and the data consumer, the memory buffer having a plurality of slots, the method including at a first one of the data producers, receiving a first data unit with a sequential number; calculating an insertion index for the first data unit based on the sequential number of the first data unit, the insertion index corresponding to a first slot in the buffer; discerning that the first slot is unavailable to receive the first data unit; and stalling the first one of the data producers from placing the first data unit in the first slot while not locking others of the data producers from placing other data units in other slots.

According to another embodiment, a computer program product having a computer readable medium tangibly recording computer program logic for maintaining data unit order by a data producing unit is disclosed, the computer program product including code to receive a data unit having a sequential number, the sequential number indicating an order of the data unit with respect to a plurality of data units; code to calculate an insertion index for the data unit within a memory buffer, the insertion index being calculated from the sequential number; code to check availability of a slot in the memory buffer, the slot corresponding to the insertion index; code to stall the data producing unit in response to determining that the slot is unavailable, wherein stalling the data producing unit does not include locking other data producing units from the memory buffer; and code to place the data unit in the slot subsequently to at least one other data unit with a sequential number higher than that of the data unit.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments include systems, methods, and computer program products providing an efficient queuing and buffering mechanism that performs element ordering of a sequence that has an increasing consecutive sequence number associated with each element. An efficient ordering mechanism according to the present disclosure can be used in packet networks where transport protocols require guaranteed delivery and ordering of packets for reliable transmission. Various embodiments can be used across nodes within a network to reorder packets delivered out of sequence, or can be used internally by a network node to enforce packet ordering when processing packets or transmitting packets into a network. In fact, any use in which data units are reordered may benefit from various embodiments.

A concept disclosed herein includes solving the complexities of parallel data unit processing in a highly parallel system, where each data unit handler is operating independently from the other data unit handler(s). (i.e. no hand shaking is performed between the data unit processors). More broadly, the data unit processors operate independently on separate slots of the sequence queue, thus not requiring a locking mechanism between data unit processors when placing data units in the sequence queue.

In one example, there are multiple data producers receiving data from a buffer pool (the buffer pool may receive the data from a network). The data from the buffer pool may or may not be in order when it is passed to the producers, and in some embodiments the producers themselves have different processing times that cause an out-of-order condition for the data. In any event, the data may be out of order at the point where it passes from the producers to the sequencing buffer.

Furthermore in this example, the data enters the system in order and includes a sequential numbering of the data units. The sequential numbering may be applied when the data units are received into the system or may be applied sometime before the data units are received. In this example, the sequential numbering is a manifestation of the order of the data units, and the order of the data units is preserved at the data consumer side. The producers may have different processing times causing the data units to become out of order. This is explained in more detail below with respect to FIG. 1.

The producers process the data units and then place the data units in slots in a circular buffer. A producer calculates an insertion index for each of the data units that it places in the circular buffer. The insertion indices can be calculated from the sequential numbering of the data units (e.g., using a modulo) so that the order of data units in the circular buffer achieves an ordering as provided by the sequential numbering. After a producer calculates an insertion index for a data unit, the producer then checks a status of a slot in the buffer that corresponds to the insertion index. If the slot is available, then the producer inserts the data unit in the slot.

On the other hand, if the slot is unavailable (e.g., because a previously-placed data unit in the slot has not yet been consumed) the producer stalls. The system includes at least one other data producer operating on the circular buffer, and the other data producers continue to insert data units into the buffer in available slots, despite the stalling of one producer. In other words, the stalling at the first data producer does not lock the other data producers from operation. Eventually the consumer will consume the data from the unavailable slot, causing the first data producer to un-stall and place its data unit in the slot.

At the consumer side of the circular buffer, the consumer removes the data units from the buffer slot-by-slot according to a tailing index, thereby placing the data units in an order corresponding to the sequential numbering. Thus, the original order of the data units is preserved.

When the consumer reaches an unavailable slot in the circular buffer (e.g., a slot that has not yet been filled by a data producer), the consumer stalls to provide time for the slot to be filled. In the meantime, the data producers continue to insert data units in the circular buffer at other queue slot indices, but as long as the buffer is large enough, the data producers will not overflow the circular buffer and the unavailable slot will eventually be filled by the lagging producer and become available for consumption. When the slot becomes available for consumption, the consumer un-stalls and continues to consume the data units slot-by-slot.

In various embodiments, the non-locking mechanism at the data producer side is relatively efficient because it minimizes congestion among the multiple producers. Also, some embodiments require little overhead because each of the data producers can be operated without regard to the state of other data producers.

Figure 1:
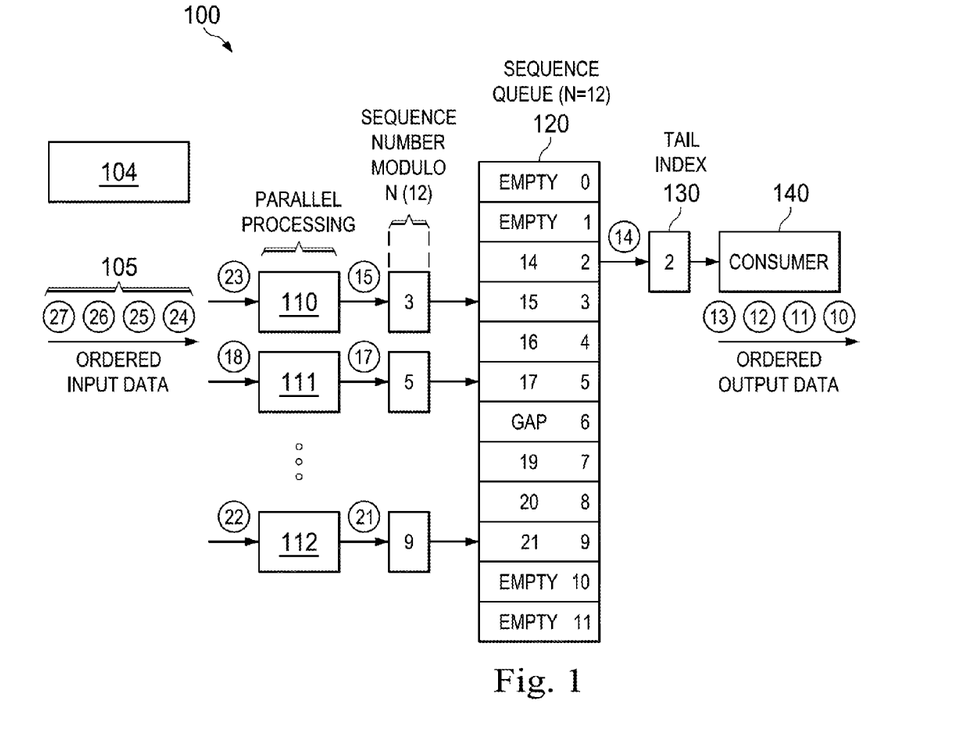
FIG. 1 is an illustration of an example computing system adapted according to one embodiment.

FIG. 1 is an illustration of an example computing system 100 adapted according to one embodiment. System 100 includes M producers 110-112, where M is an integer greater than one. An example of producers includes processor cores that receive packets and perform processing to determine respective output queues for the packets. Another example of producers includes network nodes, whether physical or virtual. In one example, system 100 is employed in a telecommunication environment that includes the delivery of voice data in a packet stream where packets are delivered in a timely and ordered manner to maintain voice quality; however, the scope of embodiments is not limited to any particular use. Embodiments may be particularly well suited for use in real-time and near real-time communication systems, and briefly describe what we mean by real-time (e.g., telephone calls, VoIP calls, videoconferencing calls, etc.) and near real-time systems (e.g., instant messaging, SMS, text messaging, etc.) and how the embodiments may be used (e.g., for ordering communication packets). In the example of FIG. 1, the data units 105 are received at the producers in order but are subsequently un-ordered due to different processing times at each of producers 110-112. The M producers 110-112 process the received data packets 105 to place/buffer them in queue 120.

The example of FIG. 1 also includes consumer 140, which reads data units from buffer 120, where the buffered data units have been re-ordered to their original sequence by the process described below. An example of a consumer is an owner of an egress queue at a network input of a server computer. Another example includes a network node that receives packets from a variety of different nodes. The scope of embodiments is not limited to any particular consumer or producer.

Data units 105 are received (e.g., from a network) in order and with a sequential numbering from buffer pool 104. In this example, the sequential numbering is illustrated by the two-digit numbers in data units 105, where a larger two-digit number indicates a later-in-time data unit. In one example, packets arriving at a port on a Network Interface Card (NIC) are assigned a consecutive sequence number by the Ethernet driver. The scope of this embodiments is not limited to a driver assigned sequence number, as any appropriate consecutive numbering scheme may be used. For instance, the input sequence number can be assigned by an external peer, external device, or by the internal receive function of the processor (e.g., an Ethernet driver).

The left side of FIG. 1 shows data units 105, which were received over a network and buffered in buffer pool 104, being passed to producers 110-112. The outputs of producers 110-112 show packets numbered 15, 17, and 21 being inserted into buffer 120. Producer 110 calculates an insertion index for the data unit labeled 15 by performing a modulo operation on the sequence number 15 with respect to the N-equals-twelve-sized buffer 120. Or put another way, in the example of FIG. 1, the insertion index is calculated from the sequence number using Equation 1 (below):

S modulo N; where N is the size of the buffer, and S is the data unit sequence number. Eq. 1

Of course, the approach is not limited to any specific size of buffer 120 (e.g., N may be greater or smaller than 12).

Therefore, for the data unit labeled 15, the insertion index is calculated to be 3. Similarly, the insertion indices for the data units labeled 17 and 21 are calculated to be 5 and 9, respectively.

Producers 110-112 insert the data units into entries (or slots) in buffer 120 that correspond to the calculated insertion indices. Producer 110 inserts data unit 15 into the buffer slot 3. Similarly, producer 111 inserts data unit 17 into slot 5, and producer 112 inserts data unit 21 into slot 9.

At the input to the producers 110-112, producer 110 has received, and is ready to process, data unit 23. Producer 111 has received data unit 18, and producer 112 has received data unit 22. In other words, data unit 18 has yet to be processed, and as a result, there is a gap at slot 6 of buffer 120 because data units 19-21 have already been processed and inserted into buffer 120. In the embodiment of FIG. 1, system 100 allows producers 110-112 to insert data units into buffer 120 in a manner such that data units with a higher sequence number (e.g., 19) may be inserted into buffer 120 at a time earlier than a data unit with a lower sequence number (e.g., 18). However, system 100 preserves the order of data units 105 as they are read out by consumer 140. The process at the consumer is described in more detail with respect to FIG. 4.

Consumer 140 reads the data units 105 out of buffer 120 and passes them on as ordered output data. Consumer 140 reads a data unit from a slot that is indicated by tail index 130. In this example, tail index 130 is a number that increments by one with each read and wraps around to zero after it reaches the slot with the highest number (in this example, slot 11). However, any appropriate tail index may be used in various embodiments.

In one example, data producers 110-112 represent cores in a multi-core processor, and data units 105 represent packets received on an input queue (not shown) from a network. In this example, the different cores process the packets by determining an appropriate output queue for each packet. Input packets are ordered by an increasing consecutive sequence number, such as a number assigned by an Ethernet driver, and independently processed by a multicore processor. Thus, in this embodiment, a packet scheduling algorithm is independent of a sequence queue usage.

Due to the differences in the packet processing times of each independent core of the multicore processor the output may not be consistent with the input ordering, thereby resulting in out-of-order packets at the outputs of the cores. Buffer 120 is used as a staging area so that consumer 140 is presented with an ordered set of packets as they become available from the processing cores.

The multiple producers 110-112 (cores) doing an insertion operation do not lock each other as they access unique slots within the sequence queue. Thus, even though one producer 110, 111, or 112 may be stalled, there is no mechanism to lock any other producer based on another producer being stalled. To avoid clashing from producers 110-112 buffer 120 is sized large enough to handle the maximum amount of inflight data at any given time. Thus, in one example, N is larger than the number of slots in buffer pool 104. Thus, system 100 omits any cooperative locking mechanism between producers 110-112, since each producer 110-112 will have a unique slot within buffer 120 for each packet being processed.

N equals twelve is an example for illustration purposes, and other embodiments may user N of any appropriate size. For instance, N of an order of magnitude of tens or hundreds may be used in various embodiments.

Figure 2:
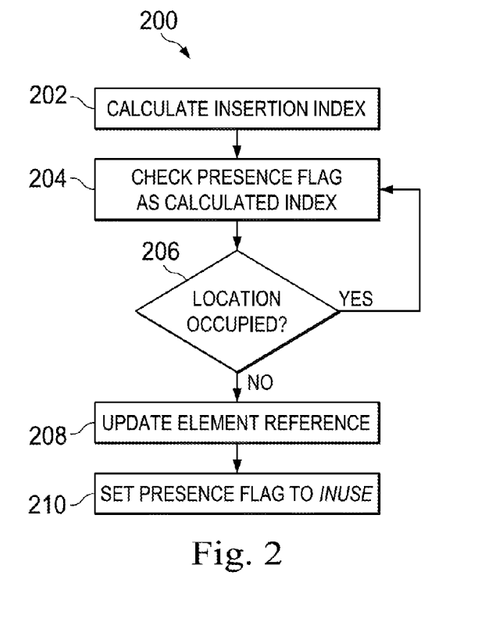
FIG. 2 is an illustration of an example method adapted according to one embodiment.

FIG. 2 is an illustration of example method 200 adapted according to one embodiment. Method 200 may be performed, individually, by each one of producers 110-112 during operation. The actions of FIG. 2 are performed by the producer as it places the data units in a buffer, such as buffer 120. FIG. 2 is from the perspective of one producer as it processes one data unit.

Arriving packets are assigned an increasing consecutive sequence number in the order from which they are processed from a receive queue. The sequence number of the arriving packets is leveraged by the packet sequencing queue to enforce packet order. The sequencing queue, to which the data units are inserted, may include a lockless circular buffer that contains a fixed number (N) of slots that support multiple producers and a consumer. The scope of embodiments includes any appropriate type of buffer that includes direct random access to addresses and indices. Examples of appropriate buffers include a fixed size array in main memory or auxiliary memory and a hardware mapped table that uses register read and write operations for access.

Further in the example of FIG. 2, each slot in the buffer has at least two pieces of data. One piece of data is a reference to a location in another memory element in which the underlying data of the data unit is stored. In this embodiment, the buffer stores element references, or pointers, rather than the actual data in the data units. However, in other embodiments, the data units may be stored in buffer slots. The examples above refer to storing the data units in the buffer and reading the data units from the buffer, and it is intended that such examples encompass storing and reading pointers to the data as well.

Another piece of data in each buffer slot is an atomic presence flag. The presence flag indicates to a producer accessing the slot, and to a consumer attempting to read from the slot, whether the slot is occupied by unconsumed data.

At action 202, the producer calculates an insertion index for the data unit that it has received and processed. As noted above, one embodiment includes calculating the insertion index according to Eq. 1 (above); however, the scope of embodiments includes any appropriate technique to calculate an insertion index that can provide a gap-less sequence over time.

In this example, the insertion index is related to the sequence number in a way that allows the packets to be read in order at the consumer side. In other words, a data unit's place in the buffer is related to the data unit's place in the overall sequence.

At action 204, the producer checks a presence flag at the buffer slot that corresponds to the calculated index. At action 206, the producer discerns whether the location is occupied by another data unit.

If the producer determines that the buffer slot is occupied, then the buffer slot is unavailable for insertion. In response, the producer stalls by returning to action 204 to check the presence flag and stays at action 204 until the presence flag changes.

If the producer determines that the slot is unoccupied, then the slot is available for insertion. In response, the producer updates the element reference at action 208 so that the reference now points to the newly-inserted data unit.

At action 210, the producer sets the presence flag to indicate that the buffer slot is occupied by a reference to a data unit that has not yet been consumed. Setting the presence flag to indicate "in use" signals the consumer of the data that the buffer slot is available for processing.

Various embodiments may add, omit, rearrange, or modify the actions of method 200. For instance, the producer may then load and process subsequent data units and perform actions 202-210 on each subsequent data unit to place the data units in the buffer. The producer may repeat actions 202-210 as many times as there is a data unit to process.

Furthermore, other producers concurrently perform actions 202-210 independently on other packets. Thus, each producer operates independently of its peers and without any cooperative locking mechanism between the producers.

Figure 3:
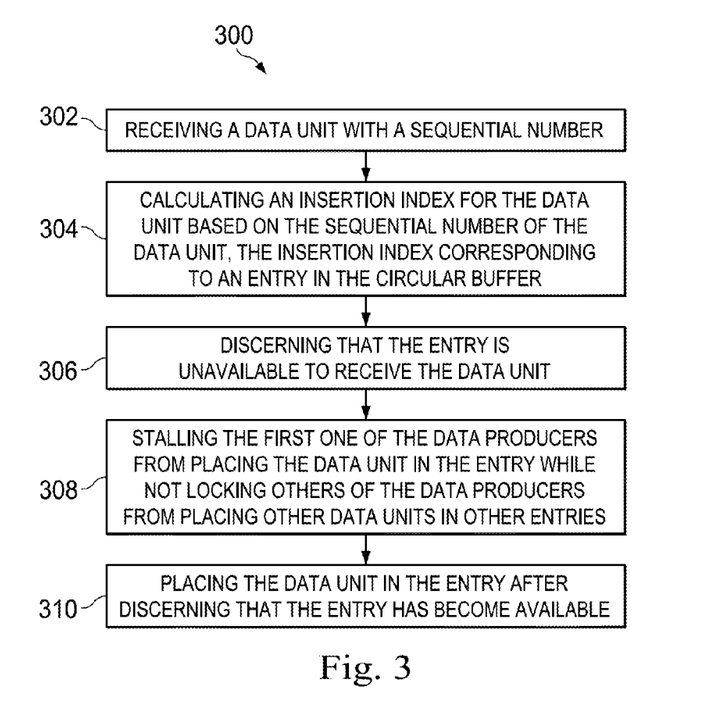
FIG. 3 is an illustration of an example method adapted according to one embodiment.

FIG. 3 is an illustration of example method 300 adapted according to one embodiment. Method 300 may be performed by a system, such as system 100 of FIG. 1, which includes multiple producers inserting data units into a buffer. FIG. 3 presents the action of one of the producers from a different aspect than is presented with respect to FIG. 2.

In action 302 the producer receives a data unit with a sequential number. Examples of sequential numbers are described above.

In action 304, the producer calculates an insertion index for the data unit based on the sequential number of the data unit. In this embodiment, the insertion index corresponds to an slot in a circular buffer. Thus, in one example, as the sequential numbers increase the insertion indices wrap from a maximum value back to zero according to the size of the buffer.

In action 306, the producer discerns that the slot is unavailable to receive the data unit. For instance, the producer may check a flag in the buffer slot or otherwise become aware that the buffer slot is unavailable at the present time. One example of unavailability includes the buffer slot including un-consumed data that should not be written over.

In action 308, the producer stalls and does not place the data unit in the buffer slot in response to discerning that the slot is unavailable. However, the system does not lock the other data producers from placing other data units in other buffer slots. Of course, any of the producers may become independently stalled because of unavailability of slots, but the system itself does not stall other producers in response to one producer stalling.

In action 310, the producer places the data unit in the slot after discerning that the slot has become available. In some embodiments the slot becomes available when a data consumer changes a flag in the slot to indicate that the slot is unoccupied. Furthermore, in this example, placing the data unit in the buffer slot may also refer to inserting a pointer to the underlying data into the buffer slot, even though the underlying data itself is actually saved in a different memory.

Similar to FIG. 2 above, the example of FIG. 3 refers to the actions of one of the data producers with respect to one data unit. The method may continue with the data producer processing and inserting subsequent data units into the buffer. Also, the other data producers operate independently of the first data producer and also perform a method the same as or similar to those in FIGS. 2 and 3.

Figure 4:
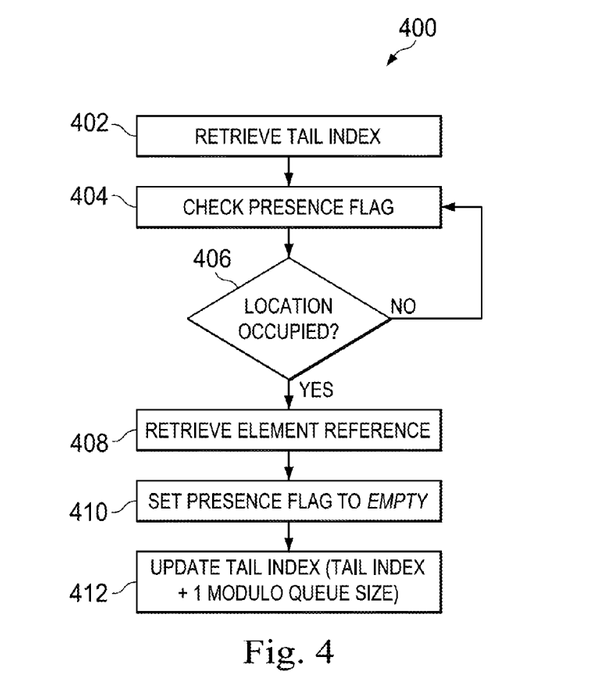
FIG. 4 is an illustration of an example method, adapted according to one embodiment.

FIG. 4 is an illustration of example method 400, adapted according to one embodiment. Method 400 may be performed by a data consumer as it reads the data units from the buffer.

The example of FIG. 4 assumes that there are data producers inserting data units into the buffer. The example also assumes that the producers set an "in use" flag when inserting data into a buffer slot. The removal operation at the buffer uses a tail index value that tracks the current removal position within the buffer. The tail index is managed by the consumer of the queue, not by the producers, and therefore does not use locking or atomic operations. The tail index is not a shared resource if there is only one consumer (as in this example), therefore reading or updating the tail index does not have to be protected from interruption and does not need to simultaneously read and write from the memory location or register that holds the tail index value. If there are multiple consumers, then a consumer-side coordination function may be used to ensure one consumer updating the tail index and processing a given slot in the queue at any given time. For simplicity of operation the examples herein describe only a single consumer, though other embodiments may include multiple consumers.

At action 402, the consumer retrieves the tail index. The consumer uses the tail index to locate the current slot to be processed.

At action 404, the consumer checks the presence flag at the buffer slot. As noted above, a producer sets the flag to "in use" when a new data unit is available at that slot. Otherwise, the flag may indicate that the slot is empty.

At action 406, the consumer discerns whether the buffer slot is occupied by a new data unit. If the data unit is available as indicated by the presence flag of the element, then the data unit can be removed at action 408. The consumer copies the data unit itself, or a pointer to the data element, from the buffer slot. The consumer does not necessarily immediately process the data unit, but may only retrieve the entry from the slot before marking it as empty. Therefore the consumer can operate on the queue in batches to minimize the overhead in accessing the queue in some embodiments.

After action 408, the consumer sets the slot presence flag to mark the slot as empty at action 410. Marking the buffer slot as empty signals to the producers that the slot can be used for the next data unit targeted for that location.

At action 412, the consumer updates the tail index. For instance, the consumer may increment the index by one and wrap the value back to zero if appropriate. In some embodiments, Equation 2 (below) provides a formula to update the tail index:

$$(\text{Tail Index}+1) \text{modulo } N. \qquad \text{Eq. 2}$$

If the buffer slot to be processed by the consumer is not occupied (e.g., presence flag is marked as empty at action 406) then that data unit in the sequence is not ready to be consumed. In this scenario the consumer is stalled waiting for that data unit to become available. Such action is shown with the arrow from action 406 to arrow 404. If the that data unit in the sequence is not available, but there are additional items in the queue following the current index, then this indicates a gap in the sequence, thus blocking the consumer until the missing element becomes available. In this example, the consumer waits until the flag in the buffer slot changes to indicate "in use".

Figure 6:
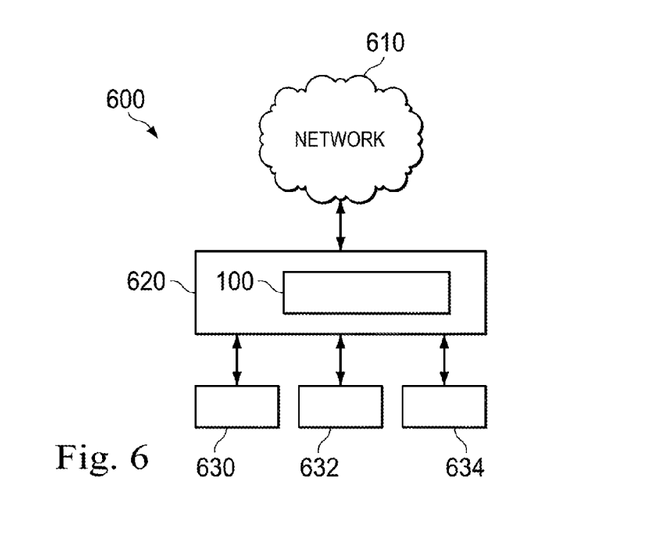
FIG. 6 is an illustration of an example system adapted according to one embodiment.

FIG. 6 is an illustration of example system 600, adapted according to one embodiment. System 600 includes network 610, which may include an intranet, the Internet, or other suitable packet-based network. Load balancer 620 receives packets over network 610. In one example, load balancer 620 includes a Session Initiation Protocol (SIP) load balancer that receives packets corresponding to multiple different SIP session flows. Load balancer 620 classifies SIP sessions in a highly parallel manner and then egresses the individual session flows to corresponding back-end SIP terminating nodes 630-634 (e.g. Session Border Controllers, or SBCs).

Load balancer 620 includes system 100 therein, where system 100 ensures that SIP packets received on the ingress side of load balancer 620 egress in the same order that they were received. As mentioned above, data producers 110-112 (FIG. 1) perform processing on the packets. In one example, data producers 110-112 within system 100 examiner each of the packets to pick out protocol specific call setup and teardown SIP messages to track new sessions and to identify particular packets as destined for a particular output queues corresponding to ones of the terminating nodes 630-634. However, various actions may be performed in different stages of a pipeline processing while other stages can be optimized for parallel processing.

Continuing with the example, the consumer (e.g., 140 of FIG. 1) egresses the packets based on the attributes of each packet being processed, either routed, switched or some other mapping (e.g., based on the destination of a SIP session).

Of course, the embodiment of FIG. 6 provides one SIP-based example. Various embodiments have applicability to any type of streaming communication where playback begins at a consumer while content is still being transmitted to it (as with streaming videos, streaming audio, etc.) . . . . In fact, the communication may be one-way/unidirectional communication (e.g., as in the case of a consumer playing back a streaming video), or the communication may be two-way/bidirectional (or more depending on the number of parties participating on a call), such as in the case of a telephone call where the consumer is both receiving communication and producing communication.

Various embodiments may add, omit, rearrange, or modify the actions of method 400. For instance, method 400 refers to the actions of the consumer with respect to one data unit. As the consumer consumes a data unit, it moves to the next buffer slot, according to the tail index, and follows the actions 402-412 as appropriate. The consumer may continue to repeat process 400 as long as there is data to be consumed.

Various embodiments may provide one or more advantages over conventional systems. For instance, various embodiments are efficient because they omit coordinated locking and the overhead associated therewith. Such efficiency may make some embodiments a fitting solution for high-throughput applications.

Additionally, the omission of a coordinated locking mechanism makes some embodiments suited for parallel packet processing through multi-core systems. Thus, where each core represents a producer, core utilization may be maximized since packets can be scheduled freely across the available cores in an efficient distribution algorithm that is independent of any traffic flow configuration.

Moreover, some embodiments are simple and can be implemented in hardware or software, as appropriate for a given application. Also, in some systems the insertion (FIGS. 2 and 3) and removal (FIG. 4) functions can be batched to optimize queue access times and reduce queuing overhead.

When implemented via computer-executable instructions, various features of embodiments of the present disclosure are in essence the software code defining the operations of such various features. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

Figure 5:
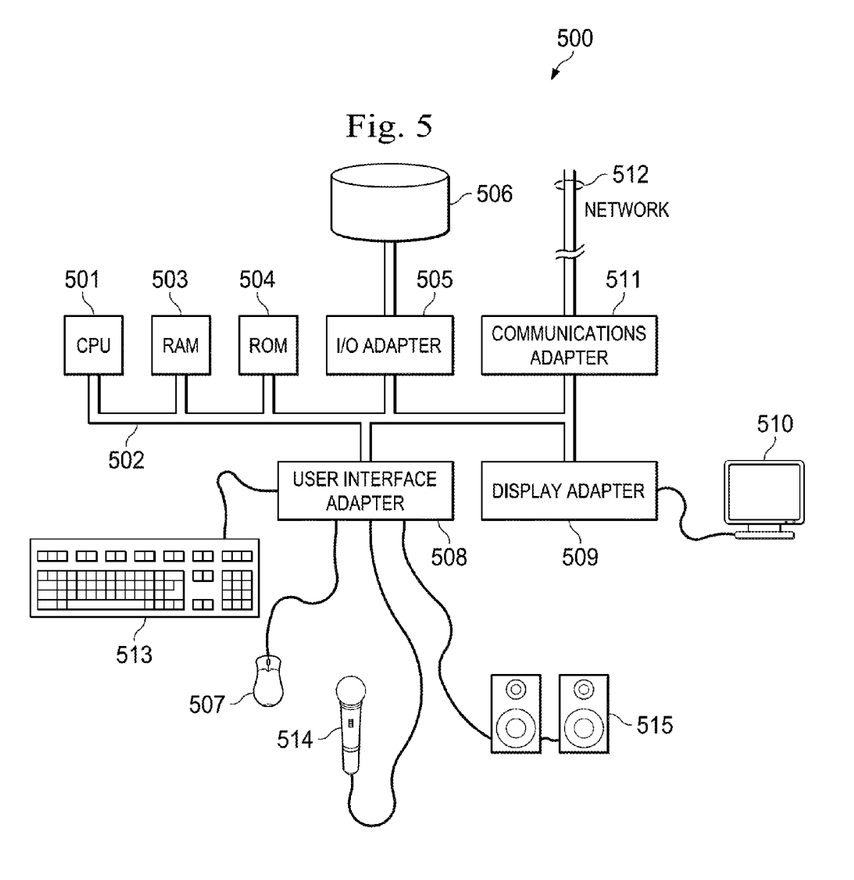
FIG. 5 illustrates an example computer system adapted according to one embodiment of the present disclosure.

FIG. 5 illustrates an example computer system 500 adapted according to one embodiment of the present disclosure. That is, computer system 500 comprises an example system on which embodiments of the present disclosure may be implemented (such as a computer acting as a network node and either producing or consuming the data units). In another example, producers 110-112 may be represented by different cores in a processor or even by different processors that are similar to CPU 501. Similarly, a consumer may be represented by a core or a processor. In various embodiments, the computer-readable instructions may be tangibly written as hardware or as firmware. Thus, while some embodiments may include a computer similar to computer system 500 performing operations of FIGS. 2-4, other embodiments may include actions of FIGS. 2-4 performed at the level of abstraction of a CPU or the cores within a multi-core CPU.

Central processing unit (CPU) 501 is coupled to system bus 502. CPU 501 may be any general purpose or specialized purpose CPU. However, the present disclosure is not restricted by the architecture of CPU 501 as long as CPU 501 supports the inventive operations as described herein. CPU 501 may execute the various logical instructions according to embodiments of the present disclosure. For example, one or more CPUs, such as CPU 501, or one or more cores, may execute machine-level instructions according to the exemplary operational flows described above in conjunction with FIGS. 2-4.

Computer system 500 also preferably includes random access memory (RAM) 503, which may be SRAM, DRAM, SDRAM, or the like. Computer system 500 preferably includes read-only memory (ROM) 504 which may be PROM, EPROM, EEPROM, or the like. RAM 503 and ROM 504 hold system data and programs.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable an administrator to interact with computer system 500 in order to input information to install new applications and keep the system running.

I/O adapter 505 preferably connects to storage device(s) 506, such as one or more of hard drive, compact disc (CD) drive, solid state drive, etc. to computer system 500. The storage devices may be utilized when system memory RAM 503 is insufficient for the memory requirements associated with storing data. Communications adapter 511 is preferably adapted to couple computer system 500 to communication link 512 (e.g., the Internet, a LAN, a cellular network, etc.). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, when interacting with an administrator.

In accordance with embodiments of the present disclosure, computer system 500 performs specific operations by CPU 501 executing one or more sequences of one or more instructions contained in system memory component 503. Such instructions may be read into system memory component 503 from another computer readable medium, such as ROM 504 or drive 506. In other embodiments, hard-wired circuitry may be used in place of (or in combination with) software instructions to implement the present disclosure.

Logic may be encoded in a computer readable, non-transitory medium. Such a medium may take many forms, including but not limited to, non-volatile media and volatile media. In various implementations, non-volatile media includes optical or magnetic disks, such as disk or solid-state drive component 506, and volatile media includes dynamic memory, such as system memory component 503. CPU 501 reads application code from the readable medium and executes the code to provide the described functionality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A parallel data unit processing system for passing data, the system comprising:
   multiple ingress data producers receiving processed data, wherein the processed data include discrete data units that are each consecutively numbered, each of the data producers calculating insertion indices for ones of the data units passing therethrough based on each consecutive number; and
   a circular buffer receiving the data units from the ingress data producers, the data units placed in slots that correspond to the respective insertion indices;
   wherein the multiple ingress data producers follow a protocol so that the multiple ingress data producers operate independently of each other and without coordination or hand-shaking with each other.

2. The system of claim 1 in which the data units comprise packets.

3. The system of claim 1 in which a first one of the ingress data producers, upon failing to place a first data unit in the circular buffer, does not lock other ingress data producers from placing other data units in the circular buffer.

4. The system of claim 1 in which the ingress data producers comprise processor cores, each of the processor cores assigning the data units to an egress queue.

5. The system of claim 4, further comprising a consumer of the data units that receives the data units from the circular buffer in an order that preserves sequential numbering of the data units, in which the consumer comprises the owner of the egress queue.

6. The system of claim 1 in which each of the slots of the circular buffer comprises a flag indicating whether the slot is in use.

7. The system of claim 1 in which each of the slots of the circular buffer comprises a reference to a particular data unit.

8. The system of claim 1 further comprising a consumer of the data units that receives the data units from the circular buffer, in which the consumer receives the first data unit from a first slot and changes a flag within the first slot to indicate that the first slot is unoccupied.

9. The system of claim 1 in which each of the ingress data producers checks a flag in a particular slot of the circular buffer and stalls upon determining that the flag indicates that the particular slot is occupied.

10. A method for passing a plurality of ordered data units in a system that includes multiple ingress data producers, a data consumer, and a memory buffer between the ingress data producers and the data consumer, the memory buffer having a plurality of slots, the method comprising:
    at a first one of the ingress data producers, receiving a first data unit with a sequential number;
    calculating an insertion index for the first data unit based on the sequential number of the first data unit, the insertion index corresponding to a first slot in the buffer;
    discerning that the first slot is unavailable to receive the first data unit; and
    stalling the first one of the ingress data producers from placing the first data unit in the first slot while not locking others of the ingress data producers from placing other data units in other slots.

11. The method of claim 10 further comprising:
    placing the first data unit in the first slot after discerning that the data consumer has marked the first slot as unoccupied.

12. The method of claim 10 in which first slot is unavailable due to being marked as occupied by the data consumer.

13. The method of claim 10 further comprising:
    at the data consumer, removing one of the data units from ones of the slots in the buffer according to a tail index that sequentially moves from slot to slot;
    the consumer stalling upon discerning that a second slot is marked as unoccupied; and
    un-stalling the consumer to remove a second data unit from the second slot after subsequently discerning that the second slot is marked as occupied.

14. The method of claim 10 in which the buffer is sized so that each ingress data producer has a slot for a plurality of data units passing therethrough.

15. A computer program product having a non-transitory computer readable medium tangibly recording computer program logic for maintaining data unit order by an ingress data producing unit, the computer program product comprising:
    code to receive a data unit having a sequential number, the sequential number indicating an order of the data unit with respect to a plurality of data units;
    code to calculate an insertion index for the data unit within a circular buffer, the insertion index being calculated from the sequential number;
    code to check availability of a slot in the circular buffer, the slot corresponding to the insertion index;
    code to stall the ingress data producing unit in response to determining that the slot is unavailable, wherein stalling the ingress data producing unit does not include locking other ingress data producing units from the circular buffer; and
    code to place the data unit in the slot subsequently to at least one other data unit with a sequential number higher than that of the data unit.

16. The compute program product of claim 1 in which the code to place the data unit in the slot comprises:
    code to place a pointer to the data unit in the slot; and
    code to save the data unit itself in another memory.

17. The computer program product of claim 15 in which the data unit is placed in the circular buffer after determining that the slot has become available.

18. The computer program product of claim 15 further comprising:
    code to mark the slot as in use after placing the data unit in the slot.

19. The computer program product of claim 15 in which the code to stall comprises:
    code to discern that the slot includes unconsumed data.

20. The system of claim 1, further comprising:
    a consumer of the data units that receives at least a subset of the data units from the circular buffer as a batch in an order that preserves sequential numbering of the data units, wherein the consumer comprises the owner of the egress queue.

* * * * *